United States Patent
Ellis et al.

(10) Patent No.: US 7,790,117 B2
(45) Date of Patent: Sep. 7, 2010

(54) FILTER VIAL

(75) Inventors: Samuel A. Ellis, Oceanside, CA (US); Kishan G. Hingorani, Irvine, CA (US)

(73) Assignee: Scientific Plastic Products, Inc., Oceanside, CA (US)

( * ) Notice: Subject to any disclaimer, the term of this patent is extended or adjusted under 35 U.S.C. 154(b) by 214 days.

(21) Appl. No.: 12/053,241

(22) Filed: Mar. 21, 2008

(65) Prior Publication Data

US 2009/0238725 A1    Sep. 24, 2009

(51) Int. Cl.
| | |
|---|---|
| *B01L 99/00* | (2010.01) |
| *G01N 1/18* | (2006.01) |
| *B01D 24/28* | (2006.01) |
| *B01D 24/00* | (2006.01) |
| *B01D 25/00* | (2006.01) |
| *B01D 27/00* | (2006.01) |
| *B01D 29/00* | (2006.01) |
| *B01D 33/00* | (2006.01) |
| *B01D 35/00* | (2006.01) |

(52) U.S. Cl. ............... 422/101; 436/178; 210/359; 210/459; 210/460

(58) Field of Classification Search ............ 422/101
See application file for complete search history.

(56) References Cited

U.S. PATENT DOCUMENTS

| | | | |
|---|---|---|---|
| 3,512,940 A | 5/1970 | Shapiro | |
| 3,832,141 A * | 8/1974 | Haldopoulos | 422/101 |
| 3,955,423 A * | 5/1976 | Ohringer | 73/863.23 |
| 4,510,058 A | 4/1985 | Cais et al. | |
| 4,734,262 A | 3/1988 | Bagshawe | |
| 4,800,020 A | 1/1989 | Savas et al. | |
| 4,891,134 A * | 1/1990 | Vcelka | 210/359 |
| 4,897,193 A | 1/1990 | Cais et al. | |
| 4,990,253 A | 2/1991 | Vcelka | |
| 5,329,739 A | 7/1994 | Madl, Jr. | |
| 5,549,816 A * | 8/1996 | Harp et al. | 210/120 |
| 5,567,309 A * | 10/1996 | Classon et al. | 210/233 |
| 5,833,860 A * | 11/1998 | Kopaciewicz et al. | 210/650 |
| 5,998,214 A | 12/1999 | Guirguis | |

FOREIGN PATENT DOCUMENTS

DE    4128923 A1 *    4/1992

OTHER PUBLICATIONS

International Search Report in Patent Application # PCT/US2009/034736.

* cited by examiner

*Primary Examiner*—Jill Warden
*Assistant Examiner*—Charles Hammond
(74) *Attorney, Agent, or Firm*—Stetina Brunda Garred & Brucker; Lowell Anderson

(57) ABSTRACT

A filter vial and piston are provided where the vial has a cylindrical wall with a closed bottom and open top and with the hollow, tubular piston therein. The piston has a distal end covered by a cup having a proximal cup seal extending outward to engage the walls of the vial to form a fluid tight seal with the vial during use. The distal end of the piston has a piston flange extending outwardly and located adjacent a recess in the piston so the cup forms a snap fit over the piston flange and extends into the recess. The piston flange causes the cup to bulge sufficiently outward to form a fluid tight seal with the vial during use. A filter is placed in the bottom of the cup.

27 Claims, 2 Drawing Sheets

FILTER VIAL

CROSS-REFERENCE TO RELATED APPLICATIONS

Not Applicable

STATEMENT RE: FEDERALLY SPONSORED RESEARCH/DEVELOPMENT

Not Applicable

BACKGROUND

Filter vials have a tubular piston with a filter at the distal end of the piston. The piston fits into a mating vial containing a fluid and things suspended in the fluid. When the piston is inserted into the vial fluid passes through the filter and into the piston in order to separate the fluid from particles or molecules too large to pass through the filter in the bottom of the piston. The filtered fluid can be extracted from the piston for further use.

The diameter and thickness of the filters can vary greatly from filter to filter and the thickness of the filter can vary greatly even across one filter. These variations make it difficult to seal the filters so all the fluid being filtered passes through the filter, and so that fluid does not wick around the peripheral edge of the filter to contaminate the filtered fluid in the piston. Further, as fluid is forced through the filters the filters can bow or otherwise deform and allow fluid to bypass the filter as it enters the body of the piston. Current assemblies use ultrasonically welded assemblies. Even if the filters are ultrasonically welded to the adjacent walls that leaves plasticizers that contaminate the fluids placed in the vials during use.

BRIEF SUMMARY

A filter vial and piston are provided that has a cup which holds a filter in position on the piston during use so that all the fluid passes through the filter and none passes around the edges of the filter. The parts are integrally molded so there is no contamination from ultrasonic welding. The parts snap-fit together, but appropriates seals are provided to prevent wicking or leakage at the location of the snap-locks.

The filter vial assembly has a longitudinal axis along which the piston moves during use. The assembly includes a tubular vial having a closed bottom and an open top with walls defining a cylindrical interior having a diameter D. A tubular piston is provided having opposing distal and proximal ends with at least the distal end being open. The piston has walls defining a cylindrical interior with an exterior facing recessed portion adjacent the distal end the piston. The piston further has a distal piston flange at or adjacent to the distal end of the piston and extending outward from piston. A filter support is located inside the piston at the distal end of the piston. A retainer cup is provided, having a sidewall extending between a proximal and distal ends of the cup with an interior diameter smaller than the distal seal on the piston. The cup has a lip extending inward toward the longitudinal axis at the distal end of the retainer cup, and further has a cup seal extending outward from the proximal end of the cup a distance greater than the diameter D. The sidewall of the cup are sufficiently flexible to deform outward as the cup passes over the distal seal on the piston so the sidewalls assume an outer dimension larger than diameter D at the location of the piston flange when the retainer cup passes over the piston distal seal. A filter is interposed between the retaining cup's lip and the distal end of the piston when the proximal end of the retainer cup is placed over the distal end of the piston.

The piston and retainer cup are placed through the open end of the filter vial so the filter cup abuts and forms a fluid seal with the inside of the vial at the location of the cup seal and at the location of the distal piston flange. Preferably, the recessed area extends entirely around a circumference of the piston. Further, while the lip preferably extends continuously around an inner circumference of the retainer cup, it could be intermittent. The piston, vial and retaining cup are made of plastic, and preferably each part is separately formed. As desired, a cap is provided where the cap is sized to releasably but snugly fit over the proximal end of the piston. Such caps are commonly used, and typically have a flexible membrane through which a needle can be inserted to withdraw filter fluid from inside the piston. Advantageously, but optionally, the proximal cup seal abuts an end of the recess in the piston during use. Preferably, there is an additional seal extending outward from the piston adjacent the proximal end of the piston and located to engage and form a fluid tight seal against the vial when the distal end of the piston is adjacent the bottom of the vial. Ideally, the piston flange has a generally triangular cross sectional shape which is larger at the proximal end and smaller at the distal end of the seal.

There is also provided a method of forming a piston for a filter vial, where the piston has a cylindrical tube with opposing proximal and distal ends. The method includes forming an outwardly extending piston flange at the distal end of the piston. A cylindrical recess is formed around a periphery of the distal end of the piston at the distal end of the piston and adjacent to the piston flange and on the proximal side of the piston flange. A filter is placed in the bottom of a retaining cup which cup is sized to fit over the distal end of the piston. The retaining cup is provided with an open proximal end and an inward extending lip at an opposing distal end which lip abuts a periphery of the filter. The method also includes placing the open proximal end of the cup over the distal end of the piston and piston flange to form a snap fit between the proximal end of the cup and the recess on the piston and advancing the retaining cup along the piston until the distal end of the piston abuts the filter. The retaining cup is provided with an outwardly extending seal at the proximal end sized to sealingly engage the inside of the filter vial during use. The retaining cup is made of sufficiently flexible material to bulge outward at the piston flange with the piston flange and retaining cup being dimensioned to extend outward a distance sufficient to form a fluid tight seal with walls of the filter vial during use.

In further variations, the method includes providing a filter support on the distal end of the retaining cup, the cup filter support located to abut the filter during use. The method can also include providing a piston filter support on the distal end of the piston, with the piston filter support located to abut the filter during use. Advantageously, the method also includes providing a piston filter support on the distal end of the piston, the piston filter support located to abut the filter during use. Finally, the method includes placing a rib on a distal edge of the piston located to form an axial facing seal around a periphery of the filter.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figures 1, 2:
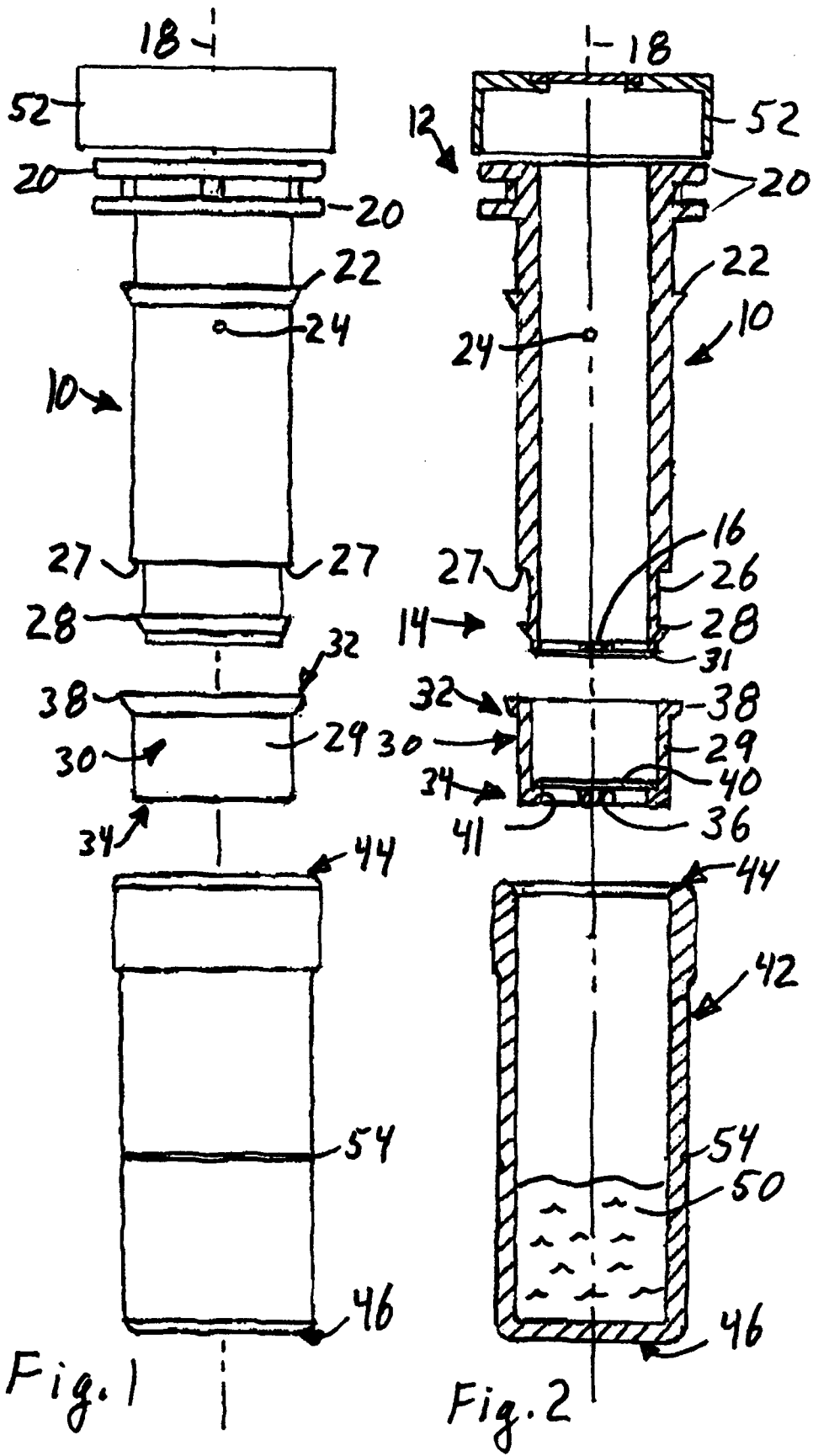
FIG. 1 is an exploded side view of a piston, retainer and vial.
FIG. 2 is a sectional view of FIG. 1.
Figure 5:
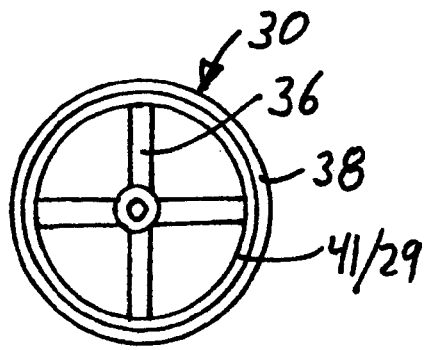
FIG. 5 is an end view of the retainer cup of FIG. 1, looking from the distal end toward the proximal end.
Figure 6:
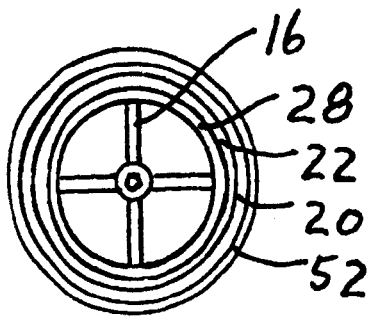
FIG. 6 is an end view of the piston of FIG. 1, looking from the distal end toward the proximal end.

Referring to FIGS. 1-4, a tubular piston 10 with a circular cross-section has proximal and distal ends 12, 14, respectively, with a porous piston support 16 located at the distal end 14. The support 16 advantageously takes the form of radial arms intersecting at a central location on the longitudinal axis 18 of the piston 10. The terms distal and proximal refer to relative locations of parts along the longitudinal axis 18, and the terms inward and outward refer to relative directions toward and away from the longitudinal axis 18. One or more flanges 20 extend radially from the proximal end 12. A first, proximal seal 22 is located adjacent to but inward from the proximal end 12 and extends outward, away from longitudinal axis 18. A vent hole 24 is adjacent the seal 22 but located slightly toward the distal end 14. Adjacent to and preferably extending to the distal end 14 is a recessed area 26 having a smaller diameter than that of the body of piston 10 forming a shoulder 27 at the location of the larger diameter portion of the piston body. An outward extending distal piston flange 28 is located adjacent the distal end 14 in this recessed area. An axially extending tip 31 (FIG. 2) is preferably, but optionally provided that encircles the distal end of the piston 10. The tip 31 preferably has a triangular cross section and is very small.

A retainer cup 30 has an inner diameter sized to fit snugly against the piston recess 26. The retainer cup 30 has proximal and distal ends 32, 34, respectively, with a porous cup support 36 over the distal end 34 and a third, cup seal 38 at the proximal end, extending outward, away from the axis 18. The support 36 is like the support 16. A membrane filter 40 fits inside the retainer cup 30 and abuts the cup support 36. The membrane filter 40 is disc shaped, usually with an axial thickness that is several times smaller than its diameter. In some situations multiple filters 40 can be stacked. An inward extending lip 41 at the distal end 34 of the cup 30 provides an axial support around the periphery of the filter 40. The tip 31 (FIG. 2) on the distal end of the piston 10 presses the filter 40 against this lip 41 when the parts are assembled.

The supports 16, 36 preferably take the form of radial struts or spokes extending from the walls of piston 10 or cup 30, respectively. But the supports 16, 36 could take other forms, such a rectangular or square grid work, or a plate with drain holes therein. A spoke with a triangular cross-section is believed suitable, with the apex of the triangle abutting the filter 40 in order to reduce blockage of the filter. Since supports 16, 36 abut opposing sides of the filter 40, a spoke with a triangular cross section will require orientating the apexes so they are toward each other. While four spokes are shown, six equally spaced spokes are believed preferable. Too many spokes block flow through the filter 40, and too few spokes allow the filter to flex and allow unfiltered fluid to bypass the filter by flowing around the periphery of the filter. The intersection of the spokes at the center is preferably small so as not to block fluid flow through the filter, with a center obstruction of about 0.1 inches for a piston 10 with an inner diameter of about 0.3 inches. The dimensions will vary with the sizes and with the strength of the materials used.

A tubular vial 42 has an open proximal end 44 and a closed distal end 46. The vial 42 is sized and shaped so the retainer cup 30 and piston 10 fit within the vial. The vial 42, cup 30 and piston 10 are preferably all cylindrical with a circular cross section, but other shapes could be used.

Figure 3:
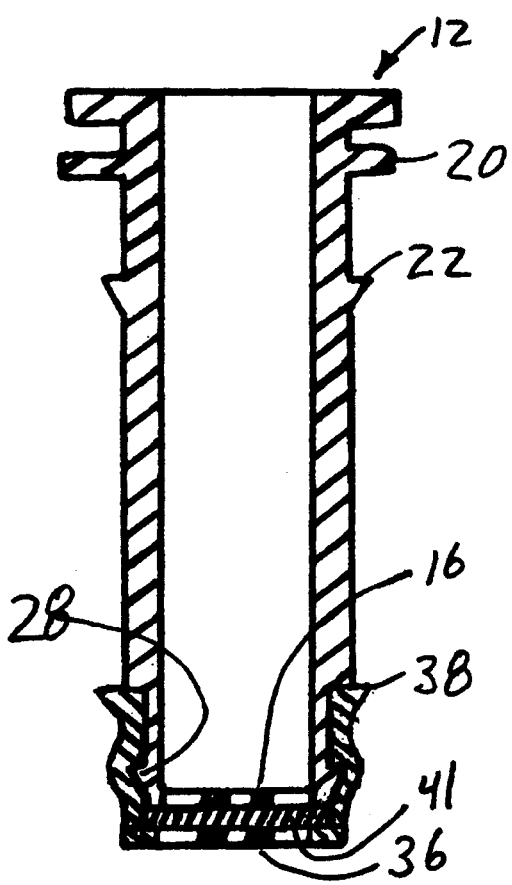
FIG. 3 is a cross-sectional view of the piston and retainer in an assembled configuration.

Referring to FIG. 3, the retaining cup 30 fits over piston flange 28 and abuts the recessed portion 26 on distal end 14 of piston 10 so the piston support 16 abuts membrane filter 40 and preferably presses the filter 40 against lip 41 and against cup support 36. Ideally the circular tip 31 provides a concentrated force around the periphery of the filter 40 to clamp the filter against the lip. The filter 40 is thus held in position by the lip 41 and tip 31, and further supported by the supports 16, 36. The tip 31 and lip 41 hold the periphery of the filter 40 in position with the tip 31 providing an axial compression seal against the filter 40. Movement, such as bowing or twisting of the body of the filter 40, is restrained by the supports 16, 36. The combination of supports 16, 36, lip 41 and tip 31 are sufficient so that the seal between the periphery of the filter 40 and lip 41 does not leak as filtrate fluid 50 is forced through the filter 40.

As the retainer cup 30 fits over the recessed portion 26, the flange 28 forces the sidewall 29 of the cup 30 outward to form a fluid tight seal and the proximal end 32 preferably abuts or comes close to shoulder 27. The piston flange 28 is preferably at or very close to the distal end 14 of piston 10, and is interposed between the outer wall of piston 10 and the inner wall of the cup 30 to form a fluid tight seal. Advantageously, the piston support 16 presses the filter 40 against the lip 41 enough to prevent any leakage past the end of the filter 30, and preferably the filter is compressed by the circular periphery of distal end 14 of piston 10, or compressed by the circular periphery of the support 16, so that any fluid wicking between the outer periphery of the filter 10 and the wall 29 of the cup 30, does not enter the cup. The location of the shoulder 27 and the axial length of the sidewall 29 of cup 30 can be selected to achieve a desired amount of compression.

As the retainer cup 30 fits over the recessed portion 26 and the seal 26, the sidewall 29 of the cup 30 is deformed outward so the outer diameter of the assembled cup 30 and piston 10 is slightly larger than the diameter of the piston body 10. The assembled cup 30 and piston 10 are then fit into vial 42 to force fluid or filtrate 50 through the filter 40 and into the hollow interior of the tubular piston 10. Preferably, but optionally, the piston flange 28 bulges the sidewall 29 of cup 30 outward enough to form a fluid tight seal with the inner walls of vial 42. The seal 38 is also sized relative to the inner walls of vial 42 to form a fluid tight seal with the vial. Advantageously, there are thus two outward facing seals adjacent the distal end 14 of the piston 10 which seal against the interior walls of vial 42.

As the piston is advanced along longitudinal axis 18, fluid or filtrate 50 passes though filter 40 and into the body of piston 10, with air escaping through vent 24. Eventually the seal 22 enters the vial 42 and also seals against the inner walls of vial 42. Filtrate 50 passing through the filter 40 is in the hollow body of piston 10 where it can be removed directly, or through an opening in cap 52 which is fitted over the proximal end 12 of the piston 10. Materials entrained in the filtrate 50 which are too large to fit through the filter 40 are retained between the filter 40 and the closed distal end 46 of the vial. Preferably the cap 52 forms a snap fit with the proximal end of the piston 10, and more preferably has an inwardly extending rim or lip that forms a snap-fit over flange(s) 20 on the piston 10.

Figure 4:
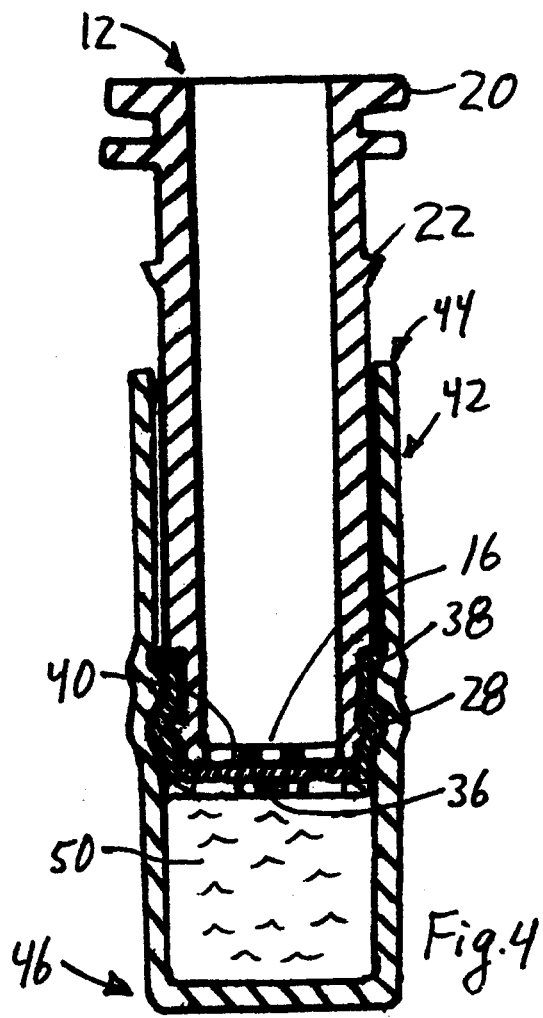
FIG. 4 is a cross-sectional view of the piston, retainer and vial in an assembled configuration with the piston partially inserted into the vial.

The amount of deformation or bulging caused by forcing the cup 30 over the flange 28 affects the quality of the fluid tight seal formed between the sidewall 29 of the cup 30 and the inner wall of vial 42 at the location of the flange 28. The deformation is affected mostly by the stiffness of the sidewall 29 on cup 30, the thickness of the wall on cup 30, the stiffness of the flange 28, the shape and size of the flange 28. Further, the flange 28 is stiff enough that it does not loose its circular shape and forms a fluid tight seal around the entire circumference of the abutting inner side of sidewall 29 of cup 30. In FIG. 4, the walls of the vial 42 are shown as slightly deforming at the two seal locations, but such deformation is optional and will vary with the thickness and material used for the vial 42. Advantageously the flange 28 has an inclined surface angled outward and inclining from the distal toward the proximal end of the piston.

The seal 38 also preferably has an inclined surface angled outward and inclining from the distal toward the proximal end of the piston. The seal 22 also preferably has an inclined surface angled outward and inclining from the distal toward the proximal end of the piston.

The seals 22, 28 and flange 38 preferably have a generally triangular cross-section, and are integrally molded with the piston 10, or cup 30. This construction allows the walls of piston 10 and vial 42 to be thin while the seals 22, 28 and flange 38 are strong and maintain their circular shape and sealing uniformity during use. Different cross-sectional shapes could be used. Likewise, the supports 16, 36 are integrally molded during formation of the piston 10 and cup 30, respectively.

The plug inserted into the hollow body of piston 10 and the hollow cup portion of cup 30 passes along the longitudinal axis 18. If the supports 16, 36 each have a triangular cross-section with the apexes of the triangles facing opposing sides of the filter 40 during use, then a mating plug must be used to form the distal end of the piston 10 to form the triangular cross-section of the supports. Alternatively, the cross-section of the struts could be generally square or rectangular n which case the reverse shapes could be formed in the molding plug with only sufficient taper to allow withdrawal of the plug after molding. The formation of supports 36 with a triangular cross section on the cup is not difficult as the triangular shape can be formed in the end of the molding plug and the angles facilitate withdrawal of the plug.

Other seal types could also be used for seals 28, 22, 38, but are believed much less desirable. For example, O-ring seals set in rectangular or semi-circular recesses could be used. But the recesses used to position such seals reduce the wall thickness and strength of the walls, making them undesirable. Thus, the seals 28, 22, 38 are preferably integrally molded or cast with the parts from which they extend. Further, the preferred piston 10, cup 30 and vial 42 are molded out of various plastics and that makes forming suitable recesses to hold the O-ring or even D-ring seals difficult because the recesses reduce the strength of the parts.

The piston 10, cup 30 and vial 42 are preferably molded of a suitable plastic, preferably one that does not contaminate samples placed in the vial 42. The vial is preferably made of polyolefin, preferably polypropylene, or other suitable polymer. The filter 40 is preferably, but optionally made of Teflon, nylon, glass fiber or other filter materials such as PVDF (polyvinyldifloride) or PES (polyethersulphone), etc.

In use, the filter 40 is placed inside the retaining cup 30. The cup 30 is then snap fit over piston flange 28 and onto the distal end of the piston 10, and preferably (but optionally) pushed along the piston until the cup seal 38 abuts the shoulder 27 on the piston. At this point the filter 40 is held between the distal end of the piston 10 and lip 41, and preferably held between the piston support 16 and cup support 36 and lip 41. The tip 31 pressing the filter 40 against lip 41 advantageously forms an axial seal encircling the filter 40 near the periphery of the filter, and further helps prevent the periphery of the filter from deforming between the spaces in the supports 16, 36 and thus helps provide a good seal at the periphery of the filter. The supports 16, 36 prevent the filter 40 from bending along axis 18 and breaking the seal at the periphery of the filter.

The tip 31 preferably has a triangular cross-section with the apex abutting the filter 40. During assembly, the tip 31 is preferably small enough that it deforms when it presses the filter 40 against the lip 41. A tip 31 having a height of about 0.01 inches is believed suitable when used on a piston 10 with an inner diameter of about 0.3 inches so the diameter of the tip 31 is slightly smaller. The tip 31 may be viewed as a rib on the circular distal edge of the tubular piston 10.

This assembly also forms two outwardly extending portions, one at the location where the piston flange 28 forces the sidewall 29 of cup 30 outward, and the other at the location of cup seal 38. Both of these seal locations are larger than the inside of tubular vial 42 and form two seals with the vial. Both of these seal locations are preferably separated by a distance sufficient that the wall of the vial 42 extends inward toward longitudinal axis 18 a slight distance in order to ensure a good fluid-tight seal at both locations.

As seen in FIGS. 1-2, the distal piston flange 28 is located slightly before the end of the piston 10, so that there is a short cylindrical section before the inclined flange 28 begins. This cylindrical section is optional. This cylindrical section could be formed by ultrasonically welding a disc-shaped filter support 16 having a cylindrical periphery onto the distal edge of the piston 10. But such ultrasonic welding leaves contaminants, as do adhesives. Thus, the filter support 16 is preferably integrally molded simultaneously with the formation of the piston 10 and thus made of the same material as the piston 10. This integral molding is usually difficult because of the length of the piston 10 is typically several times longer than the diameters of the piston so it is difficult to mold interior parts.

The piston flange 28, and to a lesser extent the flange 28 and recess 26, thus forms a snap lock to hold the retaining cup 30 onto the end of the piston 10. But the flange 28 also cooperates with the deformable wall 29 of the retainer cup 30 to bulge the sidewall 29 outward and form a sealing location at the distal end of the cup 30 and at the distal end of the piston 10.

A fill line 54 is optionally placed on the outside of the vial 42 to indicate a maximum level of fluid placed inside the vial. The walls of the vial are preferably sufficiently transparent or translucent so the placement of fluid inside the vial 42 can be seen from outside the vial to allow use of the fill line 54. The fill line 54 can be molded into the vial as an outwardly extending flange or inwardly extending recess, or the fill line can be marked by paint, marker, abrasion, laser etching, chemical etching, or other process leaving a visible indicia.

The distal end 14 of the piston 10 could hold the filter against the inwardly extending lip 41 on the cup. But preferably one, and optimally both supports 16, 36 are also used to hold the filter in place and to support the middle of the filter during use. The piston support 16 restrains the filter from bowing and leaking around the periphery as the piston advances into the vial and fluid is forced through the filter. The piston support 16 is thus preferably stronger than the cup support 36. The piston 10 can be made of an equal or stronger and harder material than the retaining cup 30, especially since the retaining cup 30 must have a sidewall 29 flexible enough to slide over the piston flange 28 and form a snap fit with the piston recess 26. Preferably the piston 10 is of the same material as the retaining cup 30, but the cup is slightly thinner and thus more flexible.

The above description is given by way of example, and not limitation. Given the above disclosure, one skilled in the art could devise variations that are within the scope and spirit of the invention disclosed herein, including various ways of shaping the seals 28, 38. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A filter vial apparatus having a longitudinal axis, comprising:
    a tubular vial having a closed bottom, an open top and walls defining a cylindrical interior with a diameter D;
    a tubular piston with opposing distal and proximal ends with at least the distal end being open, the piston having walls defining a cylindrical interior with an exterior facing recessed portion adjacent the distal end the piston, the piston further having a distal piston flange at or adjacent to the distal end of the piston and extending outward from the piston;
    a filter support located inside the piston at the distal end of the piston;
    a retainer cup having a continuous sidewall extending between a proximal and distal end of the cup with an interior diameter smaller than the distal piston flange and having a lip extending inward toward the longitudinal axis at the distal end of the retainer cup, the retainer cup further having a cup seal extending outward from the proximal end of the cup a distance greater than the diameter D, the sidewall of the cup being sufficiently flexible to deform outward as the cup passes over the distal piston flange to assume an outer dimension larger than diameter D at the location of the piston flange when the retainer cup passes over the distal piston flange; and
    a filter interposed between the retaining cup's lip and the distal end of the piston when the proximal end of the retainer cup is placed over the distal end of the piston.

2. The apparatus of claim 1, wherein the piston and retainer cup are placed through the open end of the filter vial so the retainer cup abuts and forms a fluid seal with the inside of the vial at the location of the cup seal and at the location of the distal piston flange.

3. The apparatus of claim 1, wherein the distal end of the piston has a distal edge with a rib on that distal edge, the rib extending around a circumference of the piston and being oriented to abut the filter during use so as to press the filter against the lip of the cup during use.

4. The apparatus of claim 1, wherein the lip extends continuously around an inner circumference of the retainer cup and the recessed area extends entirely around a circumference of the piston.

5. The apparatus of claim 1, wherein the piston, vial and retaining cup are made of a polymer.

6. The apparatus of claim 1, further comprising a cap sized to releasably but snugly fit over the proximal end of the piston.

7. The apparatus of claim 2, wherein the cup seal on the proximal end of the cup abuts an end of the recess in the piston.

8. The apparatus of claim 2, further comprising a seal extending outward from the piston adjacent the proximal end of the piston and located to engage and form a fluid tight seal against the vial when the distal end of the piston is adjacent the bottom of the vial.

9. The apparatus of claim 1, wherein the piston flange has a generally triangular cross sectional shape which is larger at the proximal end and smaller at the distal end of the seal.

10. A filter vial assembly, comprising:
    a cylindrical walled vial with a closed bottom and open top having a hollow, tubular piston therein, the piston having a distal end covered by a cup having a proximal cup seal engaging the walls of the vial to form a fluid tight seal when the piston is advanced into the vial a distance sufficient to engage the proximal cup seal with the vial walls, the distal end of the piston having a piston flange extending outwardly and located adjacent a recess in the piston so the cup forms a snap fit over the piston flange and extends into the recess, the piston flange causing flexible walls of the cup to bulge sufficiently outward to form a distal fluid tight cup seal with the vial when the flange and cup are inserted into the vial; and
    a filter having a periphery abutting an inwardly extending lip on the cup and held between a piston support at the distal end of the piston and the lip.

11. The filter vial assembly of claim 10, further comprising a cup support at a distal end of the cup abutting the filter.

12. The filter vial assembly of claim 10, further comprising an outwardly extending seal adjacent a proximal end of the piston sized and configured to form a fluid tight seal when engaged with the cylindrical walls of the vial.

13. The filter vial assembly of claim 11, wherein the distal end of the piston has a distal edge with a rib extending therefrom and oriented to press the filter against the lip of the cup.

14. The filter vial assembly of claim 10, further comprising a removable cap covering the proximal end of the piston.

15. The filter vial assembly of claim 12, further comprising a vent hole extending through a wall of the piston and located adjacent the seal adjacent the proximal end of the piston and distal of that piston flange.

16. A method of forming a piston for a filter vial, the piston having a cylindrical tube with opposing proximal and distal ends, comprising:
    forming an outwardly extending piston flange at the distal end of the piston;
    forming a cylindrical recess around a periphery of the distal end of the piston at the distal end of the piston and adjacent to the piston flange and on the proximal side of the piston flange;
    placing a filter in the bottom of a retaining cup which cup is sized to fit over the distal end of the piston, the retaining cup having an open proximal end and an inward extending lip at an opposing distal end which lip abuts a periphery of the filter;
    placing the open proximal end of the cup over the distal end of the piston and piston flange to form a snap fit between the proximal end of the cup and the recess on the piston and advancing the retaining cup along the piston until the distal end of the piston abuts the filter, the retaining cup having an outwardly extending seal at the proximal end sized to sealingly engage the inside of the filter vial during use, the retaining cup being made of sufficiently flexible material to bulge outward at the piston flange with the piston flange and retaining cup being dimensioned to extend outward a distance sufficient to form a fluid tight seal with walls of the filter vial during use.

17. The method of claim 16, further comprising providing a filter support on the distal end of the retaining cup, the filter support located to abut the filter during use.

18. The method of claim 16, further comprising providing a piston filter support on the distal end of the piston, the piston filter support located to abut the filter during use.

19. The method of claim 17, further comprising providing a piston filter support on the distal end of the piston, the piston filter support located to abut the filter during use.

20. The method of claim 17, further comprising a rib on a distal edge of the piston located to form an axial facing seal around a periphery of the filter.

21. A filter vial apparatus having a longitudinal axis, comprising:
a tubular vial having a closed bottom, an open top and walls defining a cylindrical interior with a diameter D extending between the top and bottom;
a tubular piston with opposing distal and proximal ends with at least the distal end being open, the piston having walls defining a cylindrical interior, the piston further having a distal piston flange at the distal end of the piston and extending outward from the piston;
a filter support located inside the piston at the distal end of the piston;
a retainer cup having a cylindrical sidewall extending between a proximal end and distal end of the cup, the cup having an interior diameter smaller than the distal piston flange, the sidewall of the cup being sufficiently flexible to deform outward as the cup passes over the distal piston flange to assume an outer dimension larger than diameter D at the location of the piston flange when the retainer cup passes over the distal piston flange, the retainer cup further having a cup seal extending outward from the proximal end of the cup a distance sufficient to seal against the vial wall when the distal piston flange is inserted into the cup and causes said outward deformation of the cup sidewall, the cup having an opening in the distal end; and
a filter covering the opening in the distal end of the cup.

22. The apparatus of claim 21, wherein the piston further has an exterior facing recessed portion adjacent the distal end the piston, with the proximal end of the cup being placed in that recessed portion during use of the assembly.

23. A filter vial assembly, comprising:
a cylindrical walled vial with a closed bottom and open top having an inner diameter D between its top and bottom, the vial having a hollow, tubular piston therein, the piston having a distal end covered by a cup having a proximal cup seal engaging the walls of the vial to form a fluid tight seal when the piston is advanced into the vial a distance sufficient to engage the proximal cup seal with the vial walls, the distal end of the piston having a piston flange extending outwardly and causing the flexible walls of the cup to bulge sufficiently outward to form a distal fluid tight seal with the vial when the flange and cup are inserted into the vial; and
a filter in a distal end of the cup located to cover an opening in the distal end of the cup through which fluid flows during use of the assembly.

24. The assembly of claim 23, wherein piston flange is located adjacent a recess in the piston so the cup forms a snap fit over the piston flange and extends into the recess during use of the assembly.

25. A method of forming a piston for a filter vial, the piston having a cylindrical tube with opposing proximal and distal ends, comprising:
forming an outwardly extending piston flange at the distal end of the piston;
forming a cylindrical recess around a periphery of the distal end of the piston at the distal end of the piston and adjacent to the piston flange and on the proximal side of the piston flange;
placing a filter in the bottom of a retaining cup which cup is sized to fit over the distal end of the piston, the retaining cup having an open proximal end and an opposing distal end with an opening in the distal end, the filter covering the opening;
placing the open proximal end of the cup over the distal end of the piston and piston flange to form a snap fit between the proximal end of the cup and the recess on the piston and advancing the retaining cup along the piston until the distal end of the piston abuts the filter, the retaining cup having an outwardly extending seal at the proximal end sized to sealingly engage the inside of the filter vial during use, the retaining cup having a sufficiently flexible side so that the side bulges outward at the location of the piston flange with the piston flange and retaining cup being dimensioned so the cup side bulges outward a distance sufficient to form a fluid tight seal with walls of the filter vial at the location of the piston flange during use.

26. A piston for a filter vial, the piston having a cylindrical tube with opposing proximal and distal ends, comprising:
an outwardly extending piston flange at the distal end of the piston;
a cylindrical recess around a periphery of the distal end of the piston at the distal end of the piston and adjacent to the piston flange and on the proximal side of the piston flange;
a retaining cup having an open proximal end which is sized to fit over the distal end of the piston, the retaining cup having a distal end opposite the proximal end with an opening in the distal end, and a continuous side extending between the proximal and distal ends of the cup, the open proximal end of the cup extending over and past the distal end of the piston and piston flange to form a snap fit between the proximal end of the cup and the recess on the piston, the retaining cup having an outwardly extending cup seal at the proximal end, the cup seal being sized to sealingly engage the inside of the filter vial during use, the side of the retaining cup being sufficiently flexible so that the side bulges outward at the location of the piston flange with the piston flange and retaining cup being dimensioned so the cup side bulges outward a distance sufficient to form a fluid tight seal with walls of the filter vial during use.

27. The piston of claim 26, wherein the distal end of the piston and the distal end of the cup each abut the filter.

* * * * *